(12) United States Patent
Cheong et al.

(10) Patent No.: US 8,009,346 B2
(45) Date of Patent: Aug. 30, 2011

(54) INTERFERENCE LIGHT MODULATOR AND DISPLAY APPARATUS EMPLOYING THE SAME

(75) Inventors: Byoung-Ho Cheong, Yongin-si (KR); Oleg Prudnikov, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/693,064

(22) Filed: Jan. 25, 2010

(65) Prior Publication Data

US 2010/0214644 A1    Aug. 26, 2010

(30) Foreign Application Priority Data

Feb. 25, 2009    (KR) .................. 10-2009-0015869

(51) Int. Cl.
G02B 26/00    (2006.01)
G02F 1/03    (2006.01)
(52) U.S. Cl. ....................................... 359/290; 359/247
(58) Field of Classification Search .............. 359/247, 359/290, 302
See application file for complete search history.

(56) References Cited

U.S. PATENT DOCUMENTS

| 6,952,303 B2 | 10/2005 | Lin |
| 7,198,973 B2 | 4/2007 | Lin |
| 7,233,029 B2 | 6/2007 | Mochizuki |
| 2004/0125281 A1 | 7/2004 | Lin |

FOREIGN PATENT DOCUMENTS

| JP | 2003-057567 | 2/2003 |
| JP | 2003-195201 | 7/2003 |
| JP | 2004-240414 | 8/2004 |
| JP | 2005-345938 | 12/2005 |
| JP | 2006-098990 | 4/2006 |
| KR | 1020020010322 | 2/2002 |
| KR | 1020080091553 | 10/2008 |

OTHER PUBLICATIONS

Extended European Search Report dated Jun. 8, 2010 in European Patent Application No. 10001127.9.

*Primary Examiner* — William Choi
(74) *Attorney, Agent, or Firm* — H.C. Park & Associates, PLC

(57) ABSTRACT

The present invention relates to an interference optical modulator and a display apparatus having the same. The display apparatus includes a metal thin film and a dielectric multiple thin film spaced apart from the metal thin film. The display apparatus may realize colors by changing an interval between the metal thin film and the dielectric multiple thin film, and may realize a black color by applying a voltage to each respective sub-pixel.

21 Claims, 16 Drawing Sheets

INTERFERENCE LIGHT MODULATOR AND DISPLAY APPARATUS EMPLOYING THE SAME

CROSS-REFERENCE TO RELATED APPLICATION

This application claims priority from and the benefit of Korean Patent Application No. 10-2009-0015869, filed on Feb. 25, 2009, which is hereby incorporated by reference for all purposes as if fully set forth herein.

BACKGROUND OF THE INVENTION

1. Field of the Invention

Exemplary embodiments of the present invention relate to an interference light modulator and a display apparatus employing the same.

2. Description of the Background

Various portable terminals have been developed with advanced communication and display devices. Examples of portable terminals include personal digital assistants (PDAs), portable multimedia players (PMPs), and digital multimedia broadcasting (DMB) devices. Portable terminals have largely used liquid crystal displays (LCDs) as flat display devices thereof. A LCD may include an optical switch by using the birefringence of a liquid crystal, and may realize colors by using a color filter. However, since the LCD uses polarization properties of light, the light use efficiency of the LCD may be low. Further, due to a color filter used in the LCD, the light use efficiency of the LCD may be lower. Since the color filter is expensive, the LCD may also be expensive. Accordingly, there is a demand for a method of creating a color image without a color filter.

SUMMARY OF THE INVENTION

Exemplary embodiments of the present invention relate to an interference optical modulator having excellent light use efficiency.

Exemplary embodiments of the present invention relate to a display apparatus having excellent light use efficiency and color purity.

Additional features of the invention will be set forth in the description which follows, and in part will be apparent from the description, or may be learned by practice of the invention.

Exemplary embodiments of the present invention disclose an interference light modulator comprising a substrate, a dielectric multiple thin film, a metal thin film, and a spacer. The dielectric multiple thin film is disposed on a surface of the substrate. The metal thin film is spaced apart from the dielectric multiple thin film. The spacer supports the dielectric multiple thin film and the metal thin film to maintain an interval between the dielectric multiple thin film and the metal thin film.

Exemplary embodiments of the present invention disclose a display apparatus comprising a substrate, a dielectric multiple thin film, a metal thin film, a spacer, and a backlight unit. The dielectric multiple thin film is disposed on a surface of the substrate. The metal thin film is spaced apart from the dielectric multiple thin film. The spacer supports the dielectric multiple thin film and the metal thin film to maintain an interval between the dielectric multiple thin film and the metal thin film. The backlight unit emits light towards the substrate or the metal thin film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
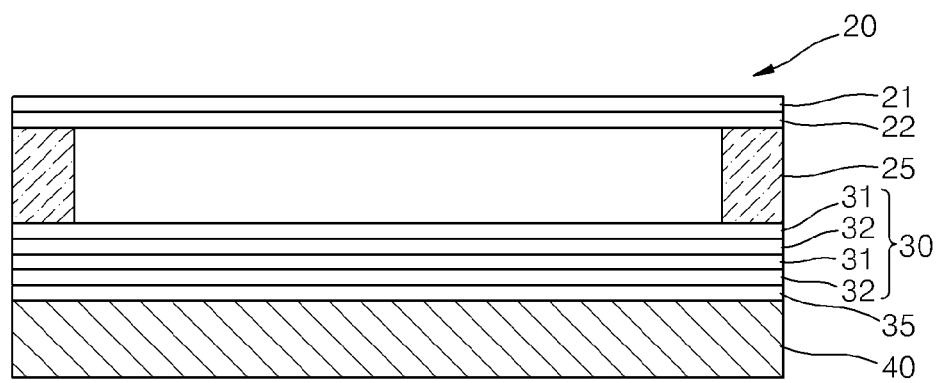
FIG. 1 is a cross-sectional view of a light modulator according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A display apparatus may realize colors by using the interference of light, may embody a switching operation, and may include a micro electronic mechanical system (MEMS) structure. The display apparatus may not include any color filter to realize colors.

FIG. 1 is a cross-sectional view of a light modulator 20 according to exemplary embodiments of the present invention. Referring to FIG. 1, the light modulator 20 may include a substrate 40, a dielectric multiple thin film 30 disposed on a surface of the substrate 40, and a metal thin film 22 spaced apart from the dielectric multiple thin film 30 by a predetermined interval. Spacers 25 are disposed between the metal thin film 22 and the dielectric multiple thin film 30 to maintain the predetermined interval between the metal thin film 22 and the dielectric multiple thin film 30.

The substrate 40 may be a glass substrate. The dielectric multiple thin film 30 may have a structure in which a plurality of layers having a large difference between their refractive indexes are alternately stacked. The dielectric multiple thin film 30 may be formed by alternately stacking a first layer 31 and a second layer 32 having a large difference between their refractive indexes to constitute a structure having two or more layers. For example, the dielectric multiple thin film 30 may be formed by alternately stacking a titanium oxide ($TiO_2$) layer having a high refractive index and a silicon oxide ($SiO_2$) layer having a low refractive index to constitute a four-layered structure. The dielectric multiple thin film 30 may function as a high-reflection film with respect to visible light. However, when the metal thin film 22 is spaced apart from the dielectric multiple thin film 30 by a predetermined interval, the dielectric multiple thin film 30 may have high optical transmissivity with respect to a predetermined wavelength. In order to increase the optical transmissivity of the dielectric multiple thin film 30, the dielectric multiple thin film 30 may have a six-layered or eight-layered structure. The metal thin film 22 may be formed of at least one of aluminum (Al), molybdenum (Mo), chromium (Cr), silver (Ag), gold (Au), tungsten (W), nickel (Ni), copper (Cu), and alloys thereof. The metal thin film 22 may be formed of a material having low optical absorption.

A transparent electrode 35, for example, an indium tin oxide (ITO) electrode may be formed between the substrate 40 and the dielectric multiple thin film 30, and the metal thin film 22 may function as a counter electrode. A dielectric layer 21 may be further disposed on a surface of the metal thin film 22. The dielectric layer 21 may be formed of oxide, nitride or mixtures thereof. For example, the dielectric layer 21 may be formed of $SiO_2$. The dielectric layer 21 may have a thickness of, for example, about 10 to about 200 nm. The thinner the dielectric layer 21, the smaller the optical transmissivity of the dielectric layer 21 in a black mode. Thus, it may be easier to realize a black color.

A method of manufacturing the light modulator 20 of FIG. 1 will now be described. The transparent electrode 35 may be formed on the substrate 40. The dielectric multiple thin film 30 may be formed by alternately stacking, for example, a $TiO_2$ layer and a $SiO_2$ layer to form, in some cases, four layers. It should be understood that any number of suitable alternating layers may be used to form the dielectric multiple thin film 30. Oxide or nitride is patterned to form the spacers 25. In some cases, the oxide may include $SiO_2$. The color of light that may be transmitted through and output from the light modulator 20 may be adjusted according to the height of each of the spacers 25. After performing the patterning operation, a photoresist may be coated on the dielectric multiple thin film 30 to planarize the spacers 25. The metal thin film 22 may be deposited on the spacers 25 and the photoresist, and the dielectric layer 21 may be deposited on the metal thin film 22. The metal thin film 22 and the dielectric layer 21 may be patterned to form pixels and the photoresist may be removed by etching, for example, wet etching. The thicknesses of the dielectric layer 21 and the metal thin film 22 may be determined according to desired reflective properties, and may be determined to obtain a suitable reflectivity, for example, 80% or more reflectivity. In addition, the metal thin film 22 may be formed of a metal material having low optical absorption in the visible light spectral region. The dielectric layer 21 may support the metal thin film 22 while preventing the metal thin film 22 from being damaged. Black color may be realized by adjusting the thickness of the dielectric layer 21 to minimize the amount of transmitted light in a black mode. That is, the optical transmissivity of the dielectric layer 21 may be greatly reduced by reducing the thickness of the dielectric layer 21.

Figure 2:
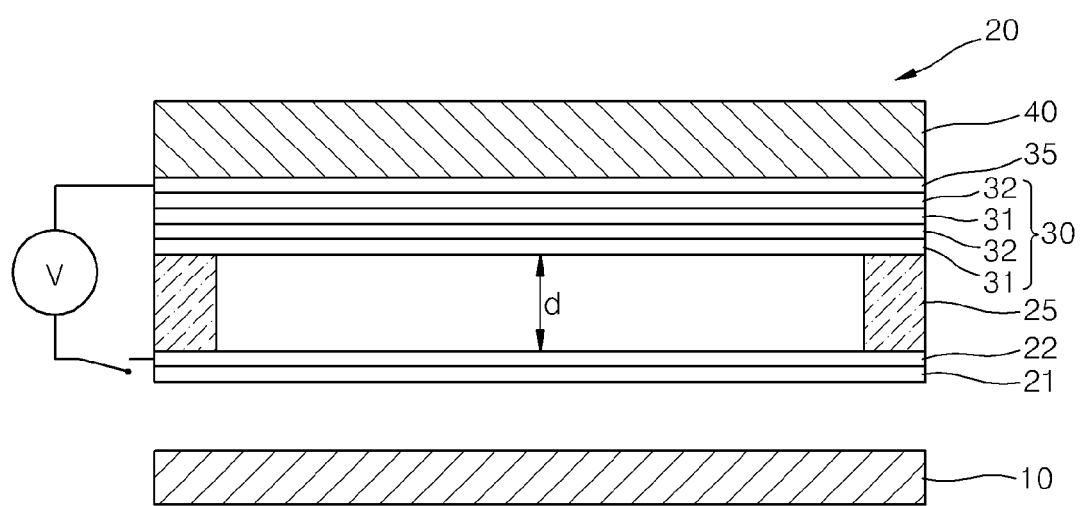
FIG. 2 is a cross-sectional view of a display apparatus according to exemplary embodiments of the present invention.

FIG. 2 is a cross-sectional view of a display apparatus according to exemplary embodiments. Referring to FIG. 2, the display apparatus may include a backlight unit 10 to emit light, a metal thin film 22 and a dielectric multiple thin film 30 which may be disposed on the backlight unit 10. In FIG. 2, the light modulator 20 of FIG. 1 may be disposed on the backlight unit 10 so that the substrate 40 may be oriented above (e.g., upwards) the metal thin film 22. By exposing the substrate 40 upwards, the metal thin film 22 or the dielectric multiple thin film 30 may be protected from external environment. The backlight unit 10 may be a direct-light type backlight unit that emits light directly from a lower portion of the light modulator 20, or a lateral-light type backlight unit that emits light from a lateral portion of the light modulator 20 towards the light modulator 20 through a light guide plate (not shown). The direct-light type backlight unit and the lateral-light type backlight unit are well known, and thus their details will not be given herein.

Figure 3:
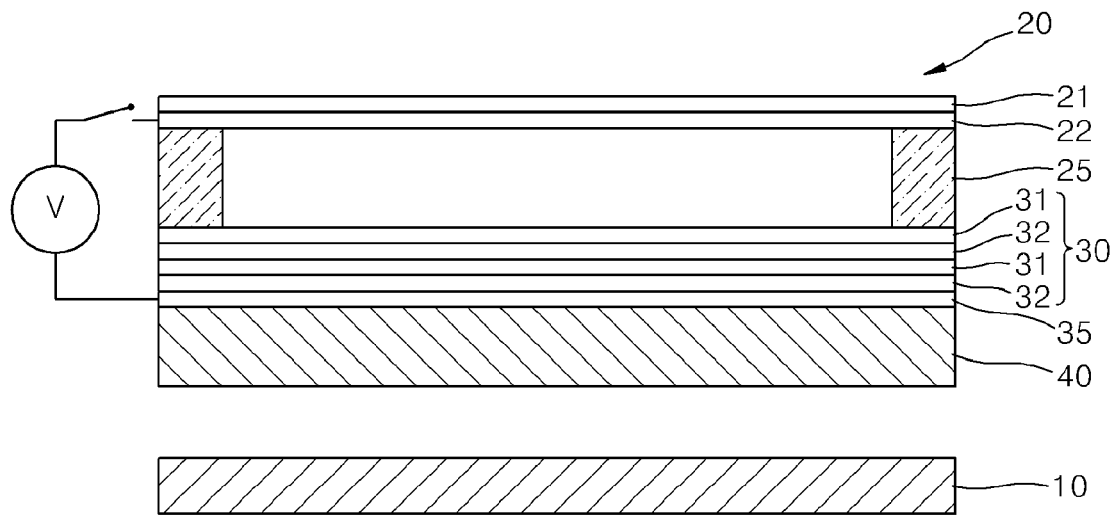
FIG. 3 is a cross-sectional view of a light modulator according to exemplary embodiments of the present invention.

In FIG. 2, the substrate 40 of the light modulator 20 may be exposed upwards. Alternatively, the substrate 40 may be disposed on the backlight unit 10, as illustrated in FIG. 3. In this case, a separate protective layer (not shown) may further be provided to protect the dielectric layer 21.

A display apparatus may include a plurality of pixels with each pixel including a plurality of sub-pixels outputting light beams of different colors. For example, each pixel of the display apparatus may include a first sub-pixel outputting a red light beam, a second sub-pixel outputting a green light beam, and a third sub-pixel outputting a blue light beam. In FIG. 2 and FIG. 3, a single sub-pixel is illustrated. The metal thin film 22 and the dielectric multiple thin film 30 may be spaced apart from each other by a predetermined interval. Spacers 25 are disposed between the metal thin film 22 and the dielectric multiple thin film 30 to maintain the predetermined interval. Dimensions of the spacers 25 may be determined to increase an area through which light passes as long as the dielectric multiple thin film 30 is supported by the spacers 25, and may be disposed at an edge portion of a sub-pixel.

The metal thin film 22 may be formed of at least one metal such as, for example, Al, Mo, Cr, Ag, Au, W, Ni, Cu and any combination thereof. The dielectric layer 21 may be disposed on a surface of the metal thin film 22, and may be formed of, for example, oxide, nitride or mixtures thereof. The dielectric layer 21 may include, for example, a $SiO_2$ layer. The metal thin film 22 may have a thickness of, for example, about 10 to about 20 nm. The $SiO_2$ layer may have a thickness of, for example, about 10 to about 200 nm.

The dielectric multiple thin film 30 may have a structure in which the first layer 31 having a relatively high refractive index and the second layer 32 having a relatively low refractive index are alternately stacked, as described with reference to FIG. 1. For example, the dielectric multiple thin film 30 may have reflectivity of about 70 to about 80%, and may have low absorption at a visible light spectral region. Each layer of the dielectric multiple thin film 30 may have a thickness of about 10 to about 1000 nm.

An output color light beam may vary according to a distance 'd,' between the dielectric multiple thin film 30 and the metal thin film 22. The distance 'd' (i.e., height of each of the spacers 25) may vary in the range of about 50 to about 1000 nm. For example, when the distance 'd' is 200 nm, a red light beam may be output. In addition, when the distance 'd,' is 64 nm, a blue light beam may be output.

Hereinafter, color realization of a display apparatus according to exemplary embodiments will be described.

Figure 4:
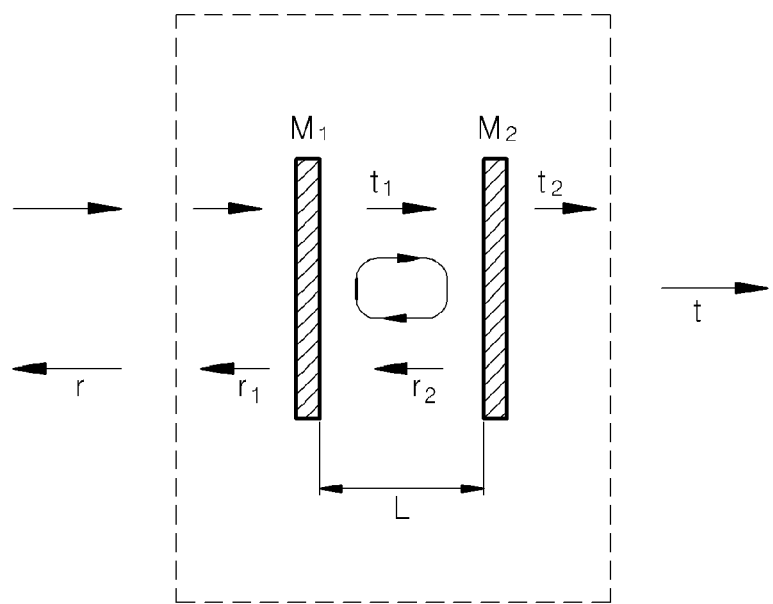
FIG. 4 is a diagram for explaining reflectivity and transmissivity with respect to an interval between two thin films according to exemplary embodiments of the present invention.

Referring to FIG. 4, a first thin film M1 and a second thin film M2 are provided, and are spaced apart from each other by an interval 'L'. The reflectivity and transmissivity of the first thin film M1 may be r1 and t1, respectively. The reflectivity and transmissivity of the second thin film M2 may be r2 and t2, respectively. Each of the first thin film M1 and the second thin film M2 may include a multiple thin film. When light proceeds from an external light source towards the second thin film M2 through the first thin film M1, the transmissivity of a light beam transmitted through the first thin film M1 and the second thin film M2 may be obtained using Equation 1 below, according to the transmissivity and reflectivity of each thin film, and a phase difference φ due to the interval L.

$$t = \frac{t_1 t_2 e^{i\phi}}{1 - \tau_1 \tau_2 e^{i 2\phi}} \quad (1)$$

Figure 5:
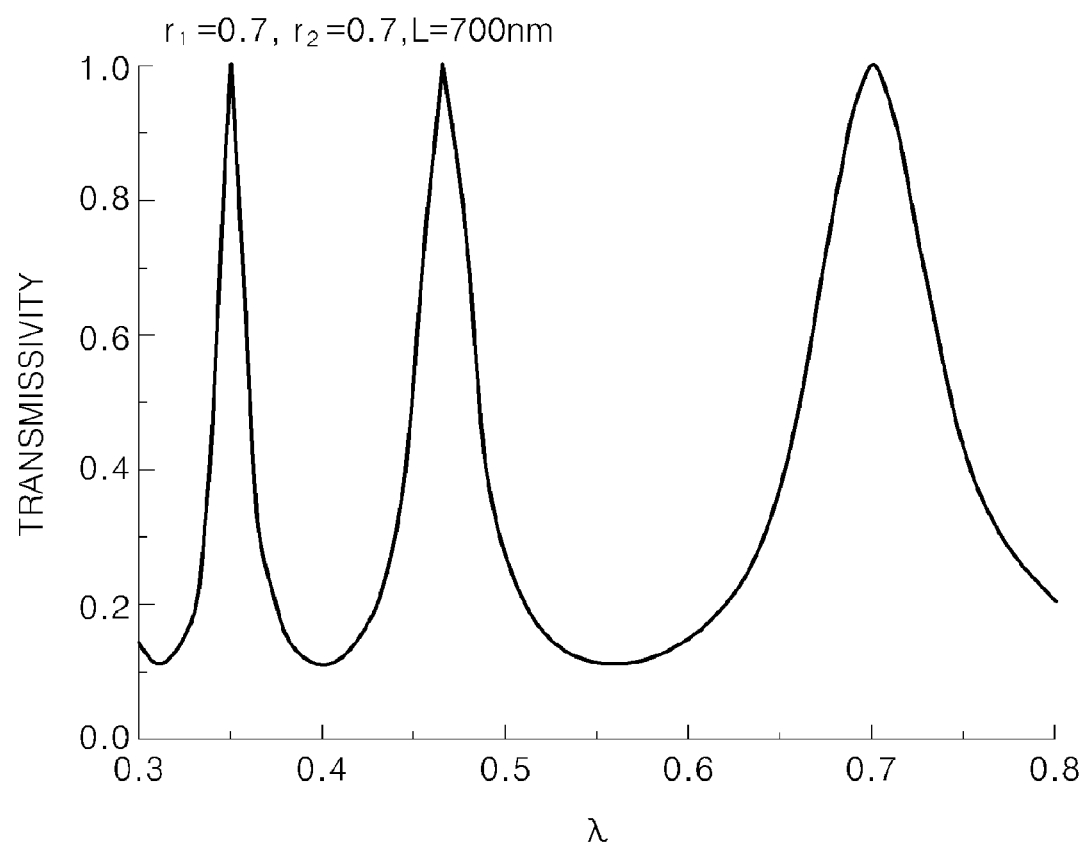
FIG. 5 is a graph showing transmissivity with respect to wavelength when the reflectivity of each thin film of FIG. 4 is 0.7, and an interval between thin films is 700 nm according to exemplary embodiments of the present invention.

According to Equation 1, when the denominator is minimized, the transmissivity may be maximized. In Equation 1, when r1 and r2 are close to 1, and the phase difference φ is integral multiples of 180 degrees, the denominator may be maximized. For example, FIG. 5 is a graph showing transmissivity with respect to wavelength when r1=0.7, r2=0.7, and L=700 nm. Although only two thin films are illustrated in FIG. 4, a peak position and transmissivity at a predetermined wavelength vary according to the thickness, number, and kind of thin films. In order to obtain high transmissivity at a predetermined wavelength, a multiple thin film having excellent reflectivity may be manufactured by using dielectric and metal materials having low absorption at a visible light region, or using a combination of a dielectric multiple thin film in terms of the construction and thickness.

Figure 6:
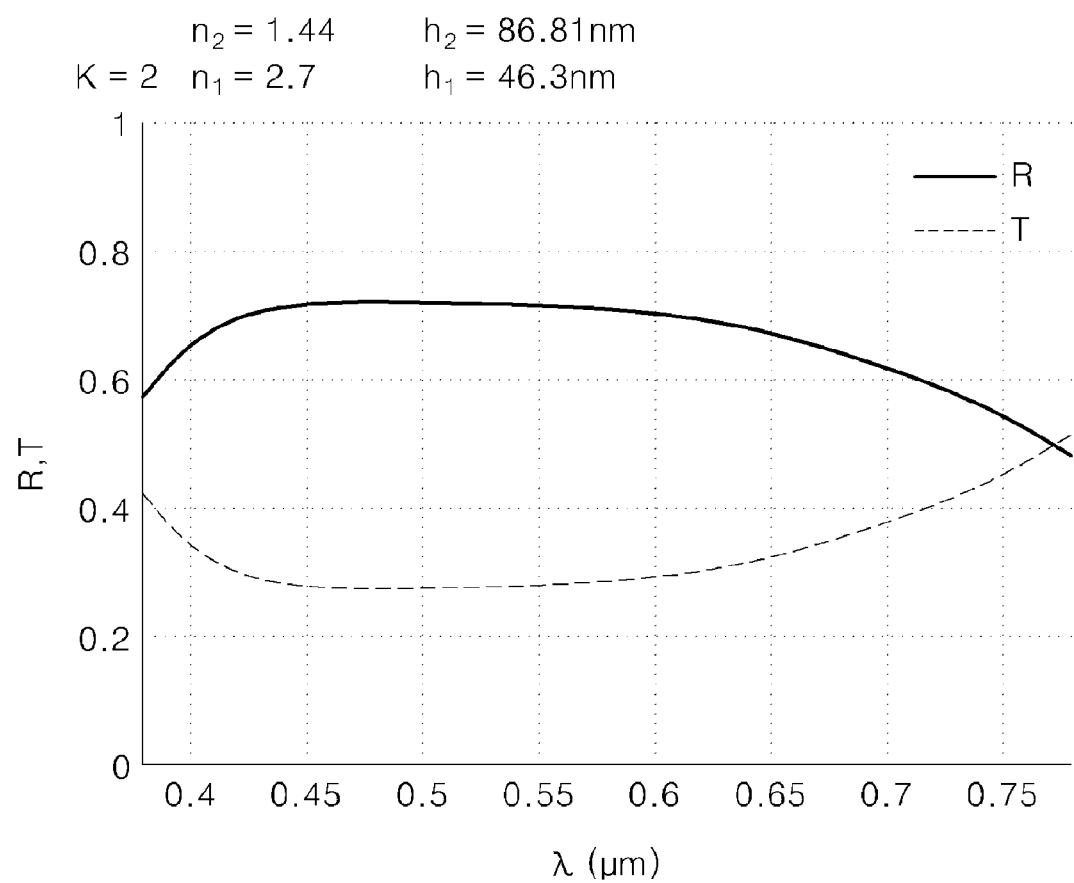
FIG. 6 is a graph showing transmissivity and reflectivity of a dielectric multiple thin film of a display apparatus with respect to a wavelength according to exemplary embodiments of the present invention.
Figure 7:
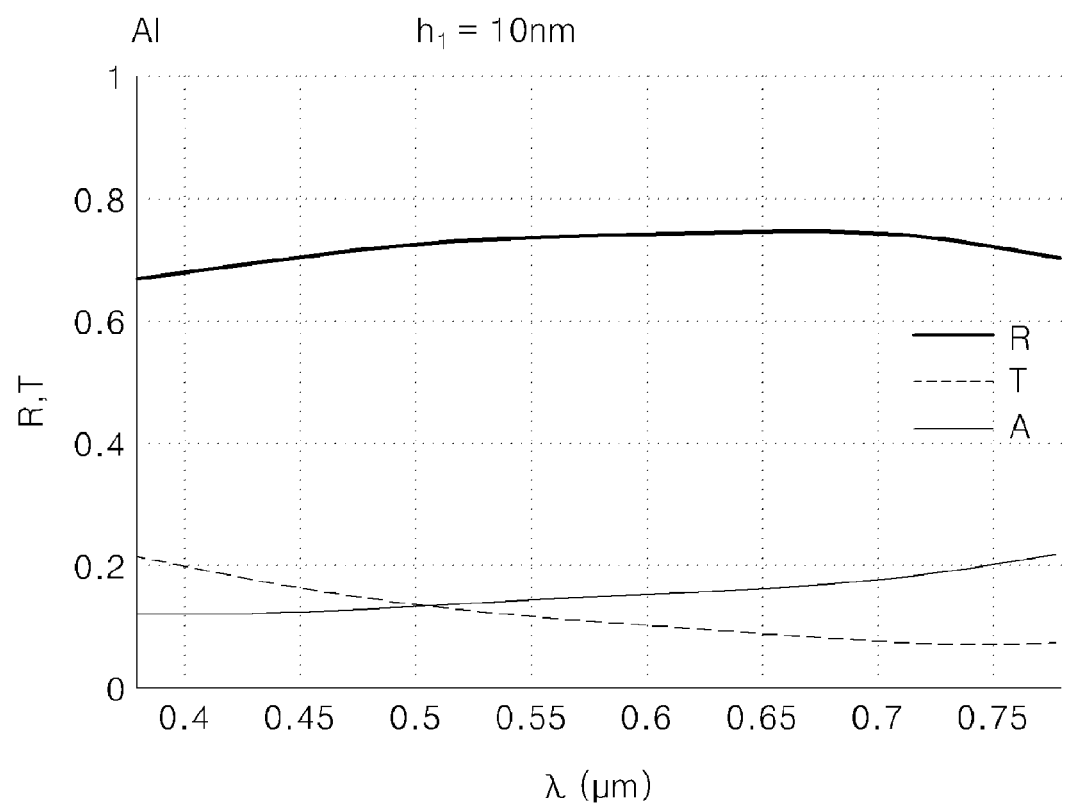
FIG. 7 is a graph showing reflectivity, transmissivity, and absorption of a metal thin film of a display apparatus with respect to a wavelength according to exemplary embodiments of the present invention.

For example, the light modulator 20 may include the dielectric multiple thin film 30 and a double layer having the metal thin film 22 and the dielectric layer 21. The metal thin film 22 may be formed of aluminum (Al) or argon (Ag), and may be formed with a thickness of about 10 to about 20 nm. The dielectric layer 21 may be formed of $SiO_2$ with a thickness of 100 nm. An Al metal thin film may have reflectivity of about 80% and an Ag metal thin film may have reflectivity of about 90%. FIG. 6 is a graph showing the transmissivity T and reflectivity R of a dielectric multiple thin film of a display apparatus with respect to wavelength according to exemplary embodiments. Referring to FIG. 6, the transmissivity T and reflectivity R are shown with respect to light at an incident angle θ of 0 degrees. The dielectric multiple thin film used in FIG. 6 may have a structure in which four layers are formed by alternatively stacking a $TiO_2$ layer having a thickness 'h1' of 46.3 nm and a refractive index 'n1,' and a $SiO_2$ layer having a thickness 'h2' of 86.81 nm and a refractive index 'n2.' 'K' may be the number of stacked layers including a pair of a high-refraction thin film and a low-refraction thin film. In the case of a four-layered structure, K=2. FIG. 7 is a graph showing the reflectivity R, transmissivity T, and absorption A of an Al metal thin film having a thickness 'h1' of 10 nm. According to Equation 1, the higher the effective reflectivity of thin films at lower and upper portions of a display apparatus, the higher the optical transmissivity. Referring to FIG. 6 and FIG. 7, the reflectivity of a dielectric layer and a metal thin film may be about 60% or more.

Figure 8A:
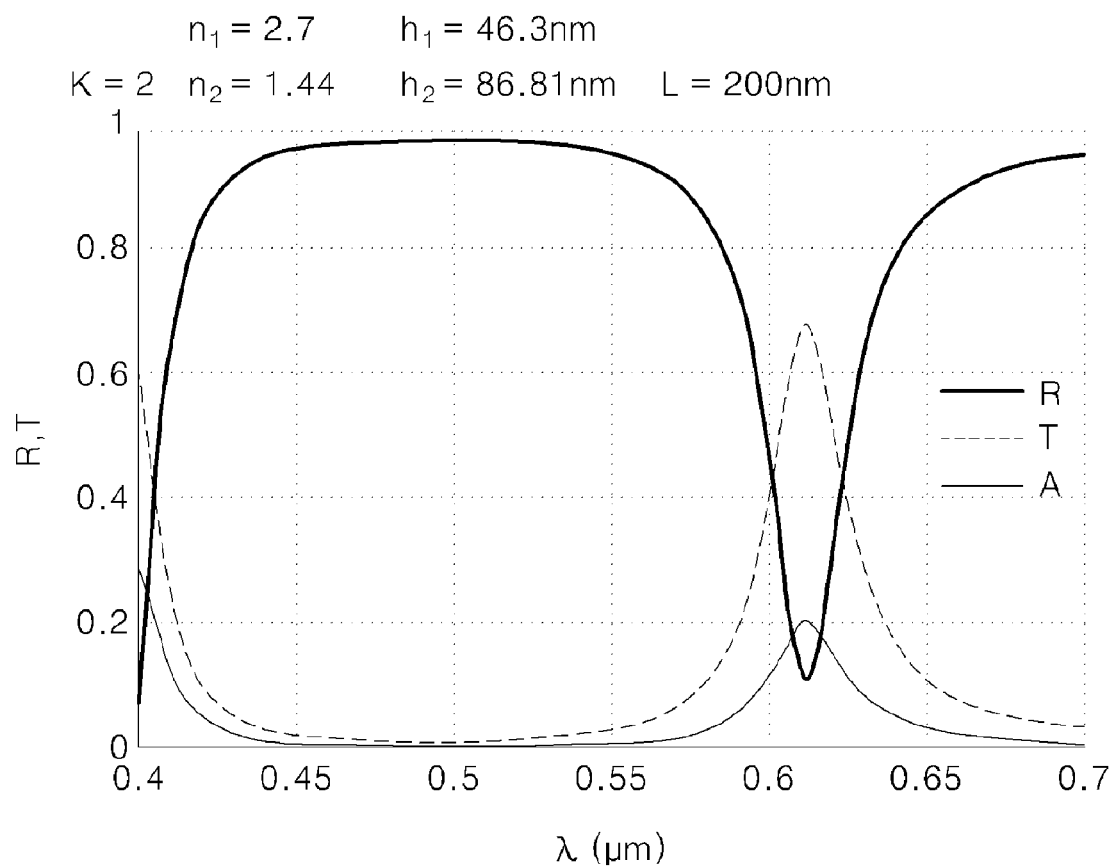
FIG. 8A is a graph showing reflectivity, transmissivity, and absorption with respect to wavelength when a spacer of a display apparatus has a height of 200 nm according to exemplary embodiments of the present invention.
Figure 8B:
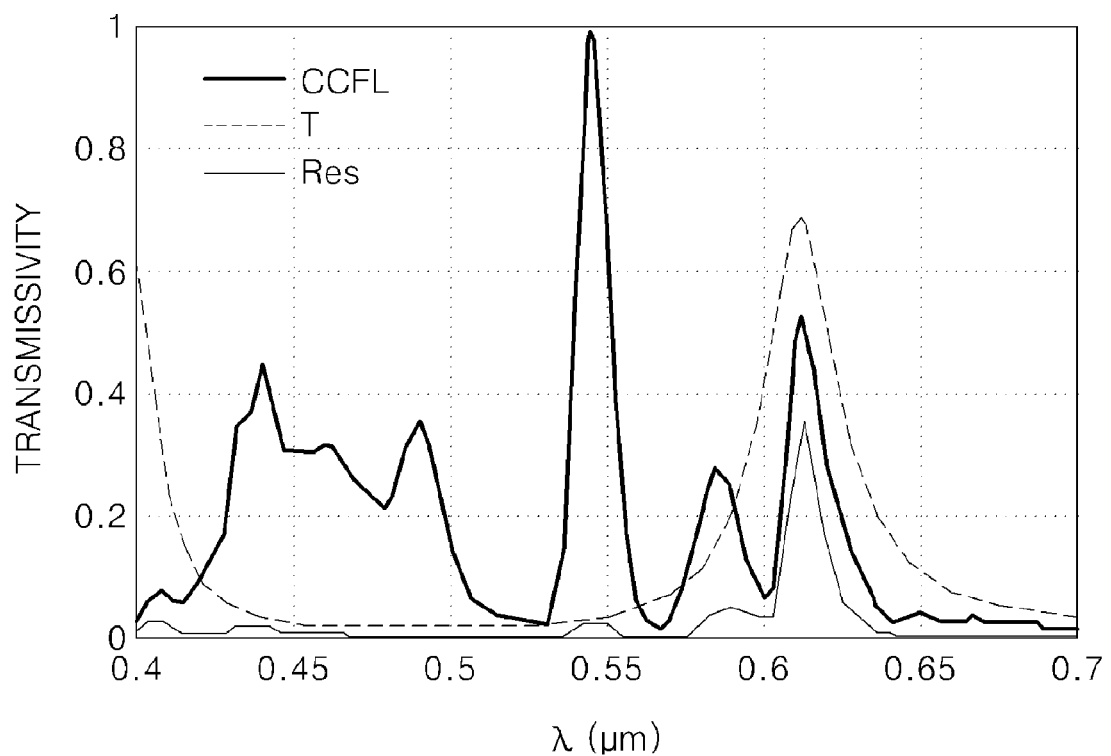
FIG. 8B is a graph showing a spectrum of light transmitted through a light modulator of a display apparatus when a spacer has a height of 200 nm according to exemplary embodiments of the present invention.
Figure 8C:
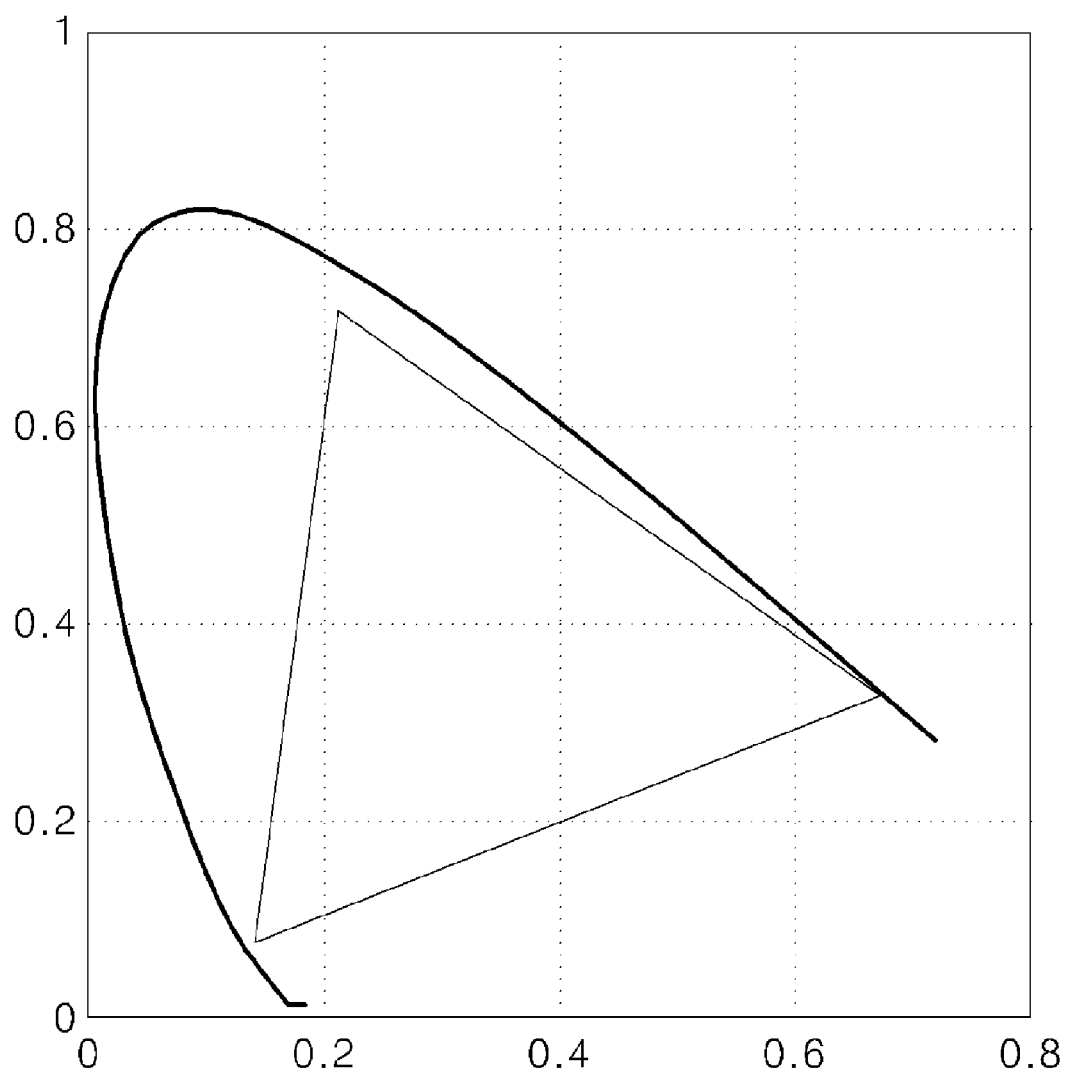
FIG. 8C shows color gamut when a spacer has a height of 200 nm according to exemplary embodiments of the present invention.
Figure 9A:
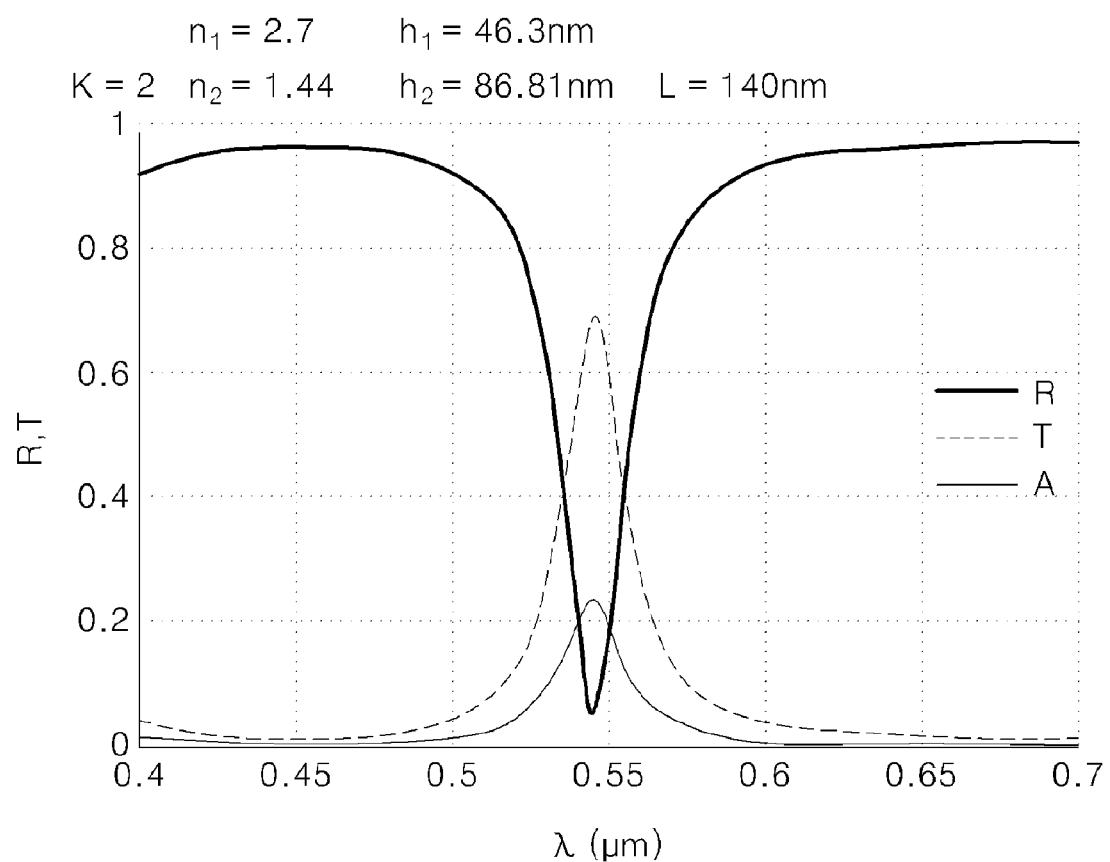
FIG. 9A is a graph showing reflectivity, transmissivity, and absorption with respect to wavelength when a spacer of a display apparatus has a height of 200 nm according to exemplary embodiments of the present invention.
Figure 9B:
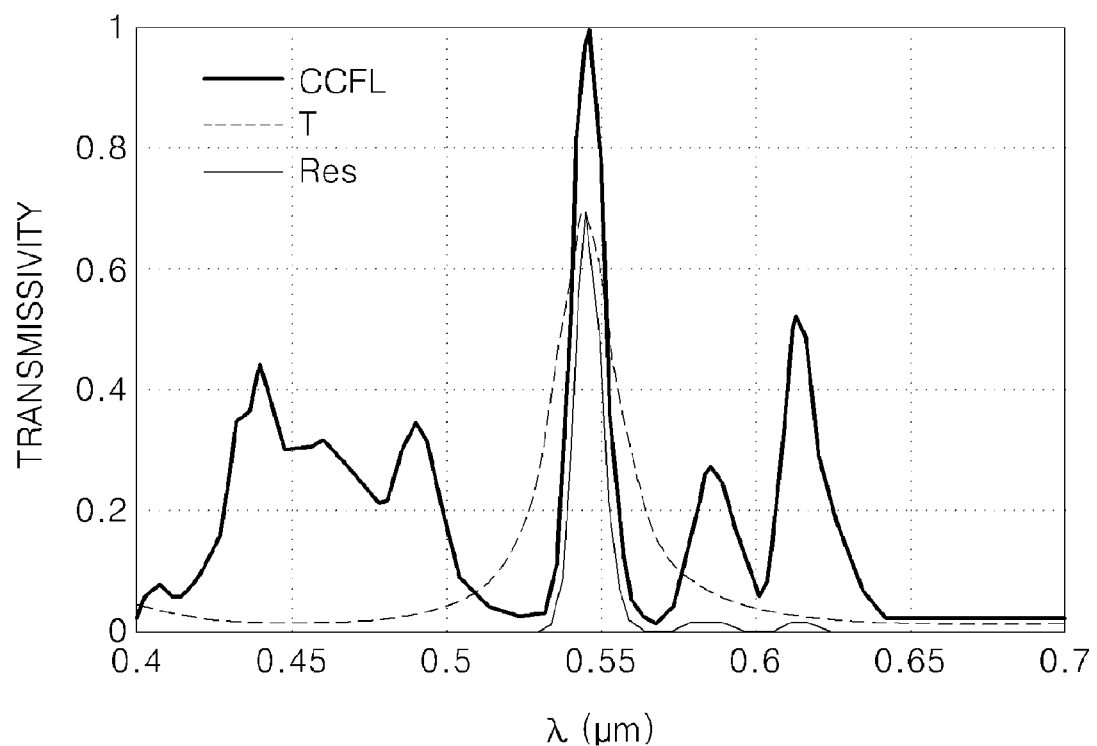
FIG. 9B is a graph showing a spectrum of light transmitted through a light modulator of a display apparatus when a spacer has a height of 140 nm according to exemplary embodiments of the present invention.
Figure 9C:
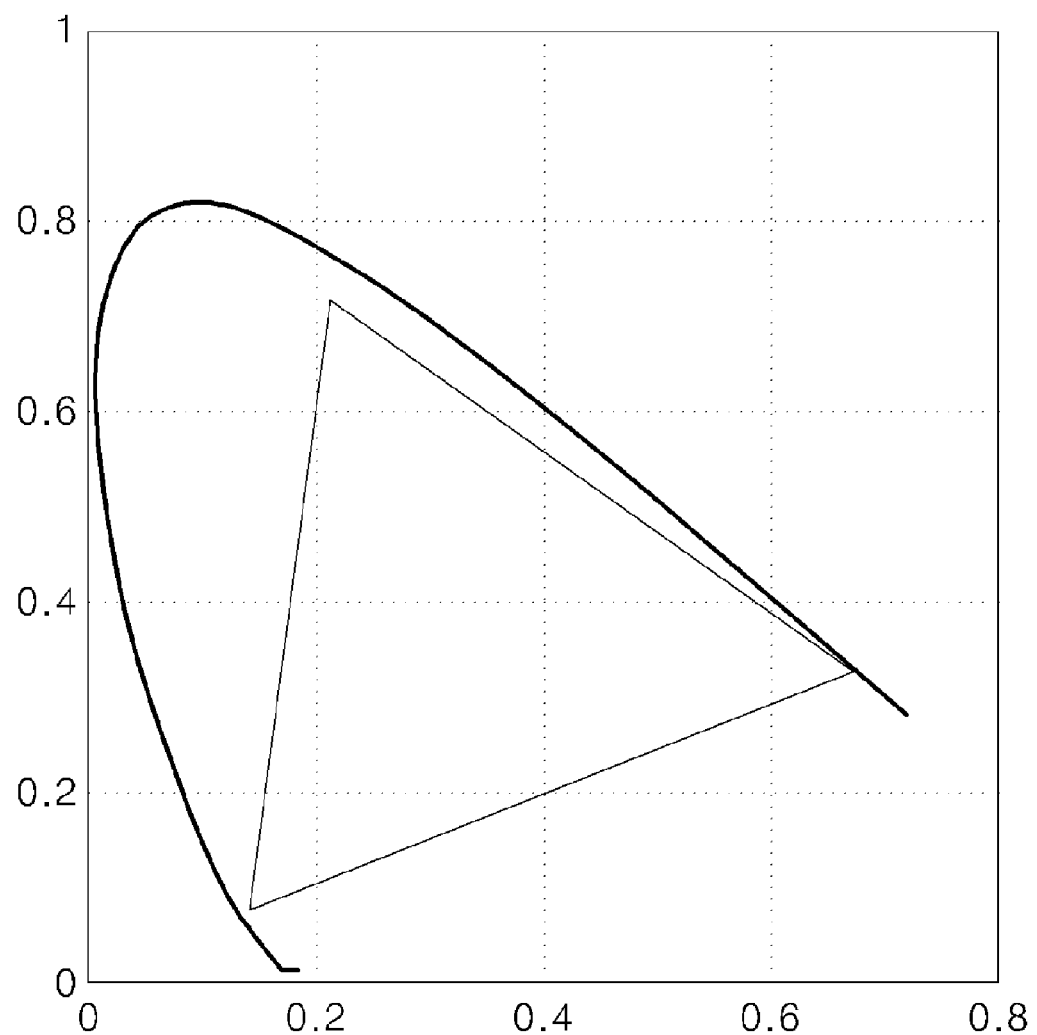
FIG. 9C shows color gamut when a spacer of a display apparatus has a height of 140 nm according to exemplary embodiments of the present invention.
Figure 10A:
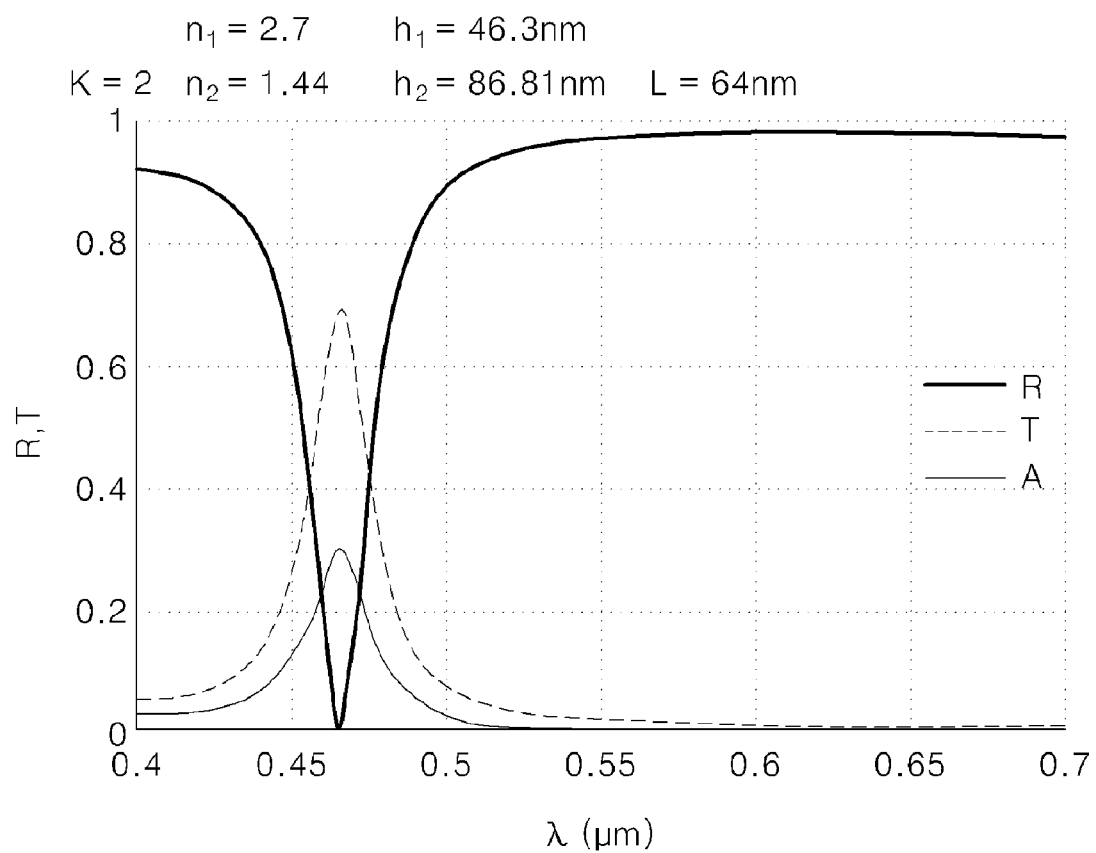
FIG. 10A is a graph showing reflectivity, transmissivity, and absorption with respect to wavelength when a spacer of a display apparatus has a height of 64 nm according to exemplary embodiments of the present invention.
Figure 10B:
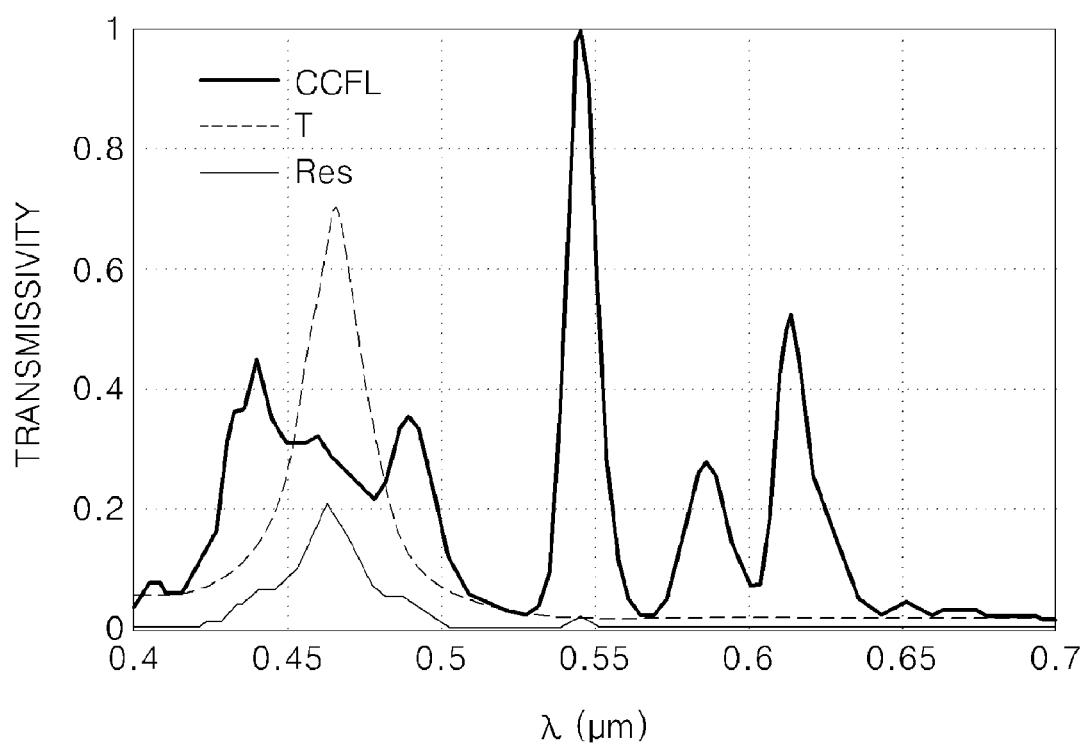
FIG. 10B is a graph showing a spectrum of light transmitted through a light modulator of a display apparatus when a spacer has a height of 64 nm according to exemplary embodiments of the present invention.
Figure 10C:
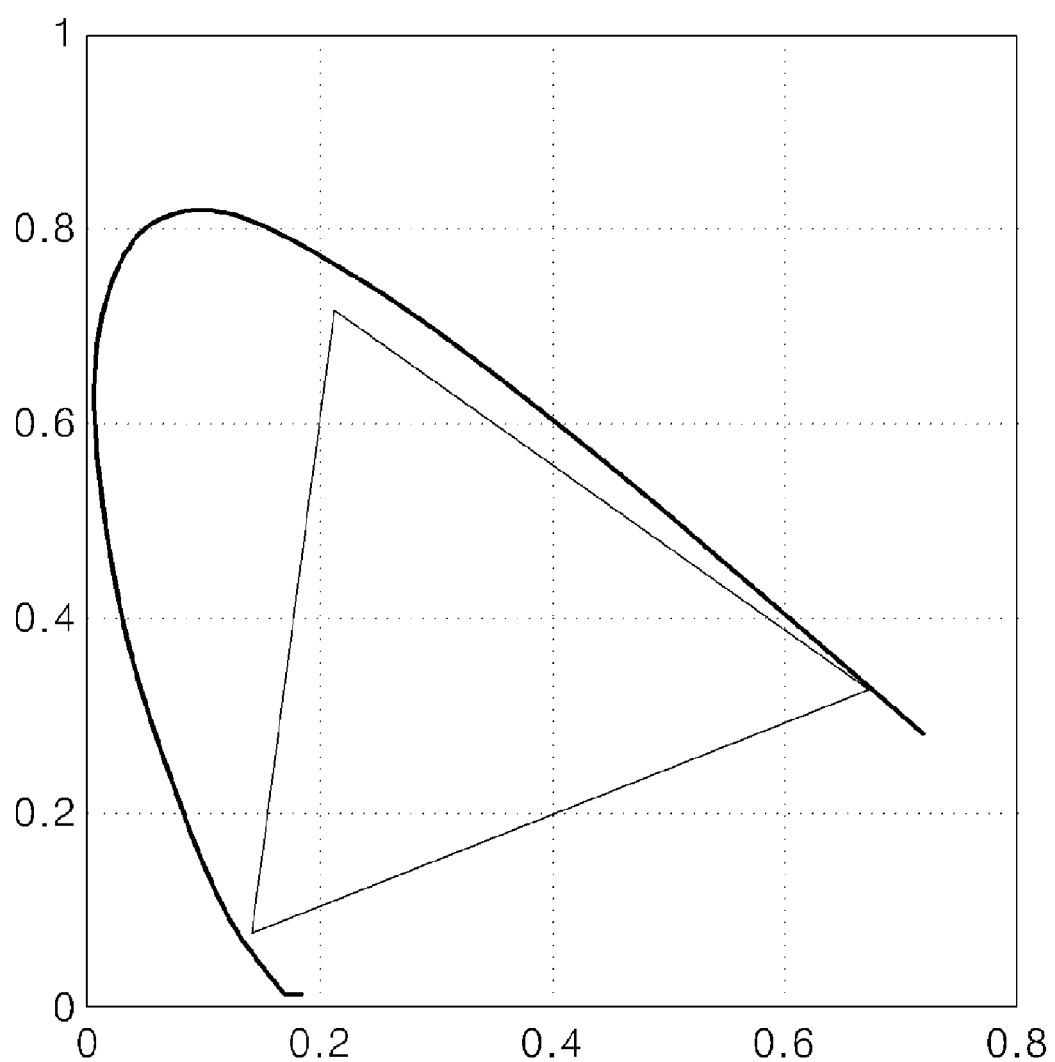
FIG. 10C shows color gamut when a spacer of a display apparatus has a height of 64 nm according to exemplary embodiments of the present invention.

FIG. 8A is a graph showing reflectivity R, transmissivity T, and absorption A with respect to wavelength when a spacer of a display apparatus has a height of 200 nm according to exemplary embodiments. Referring to FIG. 8A, the transmissivity of light at a red wavelength band may be relatively high, and the reflectivity of light at the remaining wavelength band (e.g., apart from the wavelengths corresponding to the red band) may be relatively high. FIG. 8B is a graph comparing a spectrum of light transmitted through a light modulator of a display apparatus when a spacer has a height of 200 nm with a spectrum of a cold-cathode fluorescent lamp (CCFL), and a 'Res' spectrum corresponding to a result in which the absorption A of FIG. 8A is applied to the transmissivity T of FIG. 8A. FIG. 8C shows a color gamut when a spacer of a display apparatus has a height of 200 nm according to exemplary embodiments. FIG. 9A is a graph showing reflectivity R, transmissivity T, and absorption A with respect to wavelength when a spacer of a display apparatus has a height of 140 nm according to exemplary embodiments. FIG. 9B is a graph providing a comparison of a CCFL spectrum, a transmissivity T spectrum, and a 'Res' spectrum of light transmitted through a light modulator of a display apparatus when a spacer has a height of 140 nm according to exemplary embodiments. FIG. 9C shows a color gamut when a spacer of a display apparatus has a height of 140 nm according to exemplary embodiments. FIG. 10A is a graph showing reflectivity R, transmissivity T, and absorption A with respect to wavelength when a spacer of a display apparatus has a height of 64 nm according to exemplary embodiments. FIG. 10B is a graph providing a comparison of a CCFL spectrum, a transmissivity T spectrum, and a 'Res' spectrum of light transmitted through a light modulator of a display apparatus when a spacer has a height of 64 nm, according to exemplary embodiments. FIG. 10C shows a color gamut when a spacer of a display apparatus has a height of 64 nm according to exemplary embodiments.

Referring to the figures noted above, the maximum efficiency of transmitted light may be 70% or more, and a transmissive bandwidth may be narrow (e.g., 50 nm or less). Since the transmissive bandwidth is narrow, color properties may be excellent. Since the light modulator 20 uses transparent dielectric thin films except for a metal thin film, optical absorption may generally occur in the metal thin film. A backlight unit may use a CCFL light source, and each sub-pixel may emit a corresponding color light beam according to the height of a spacer. A dielectric multiple thin film may perform a filtering operation in which only a light beam having a predetermined wavelength may transmit through destructive interference and constructive interference while incident light may be repeatedly reflected and transmitted. Color properties may be adjusted according to the thickness and type of thin film. High-purity color may be realized due to a narrow bandwidth. In addition, since the display apparatus does not include any color filter in order to realize colors, manufacturing costs may be reduced, and light use efficiency may be increased, compared to display apparatuses in which a color filter is used.

Figure 11:
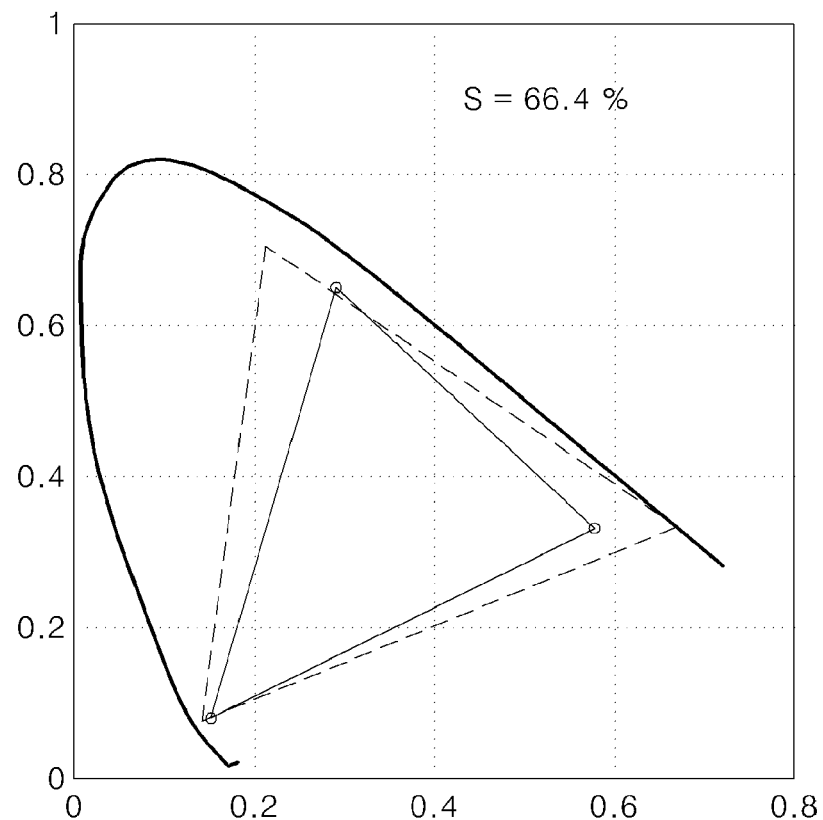
FIG. 11 shows color gamut in a display apparatus according to exemplary embodiments of the present invention.

FIG. 11 shows color gamut in a display apparatus according to exemplary embodiments. The color gamut may be about 66.4%. Since a liquid crystal or polarization film is not used for FIG. 11's display apparatus, FIG. 11's display apparatus may have higher transmissivity than a general liquid crystal display device (LCD).

Figure 12:
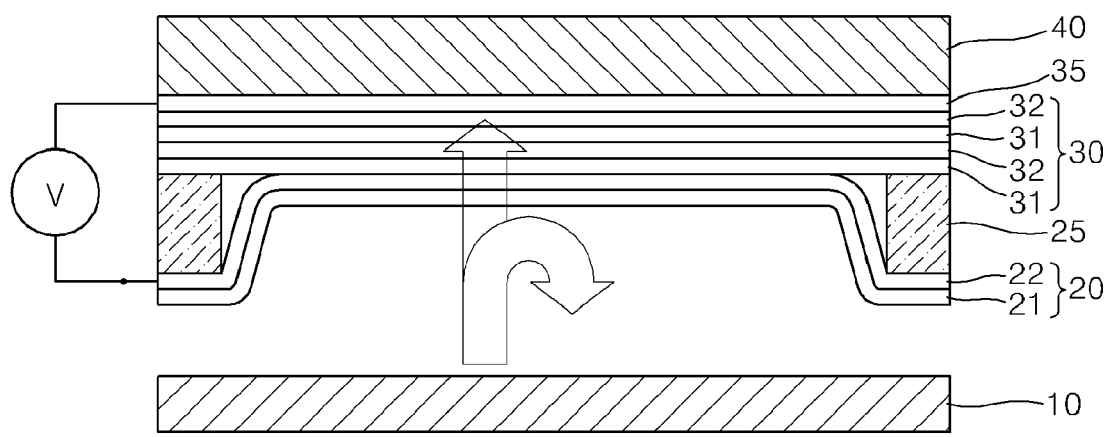
FIG. 12 is a diagram showing a black mode of a display apparatus according to exemplary embodiments of the present invention.
Figure 13A:
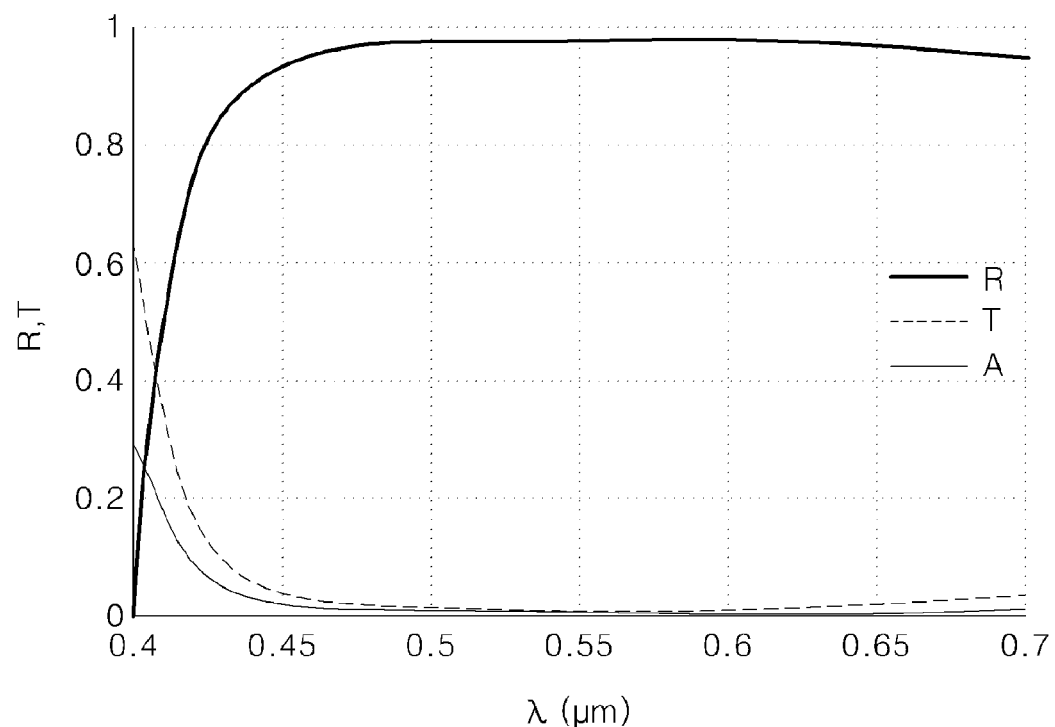
FIG. 13A is a graph showing transmissivity, reflectivity, and absorption in a black mode of a display apparatus according to exemplary embodiments of the present invention.
Figure 13B:
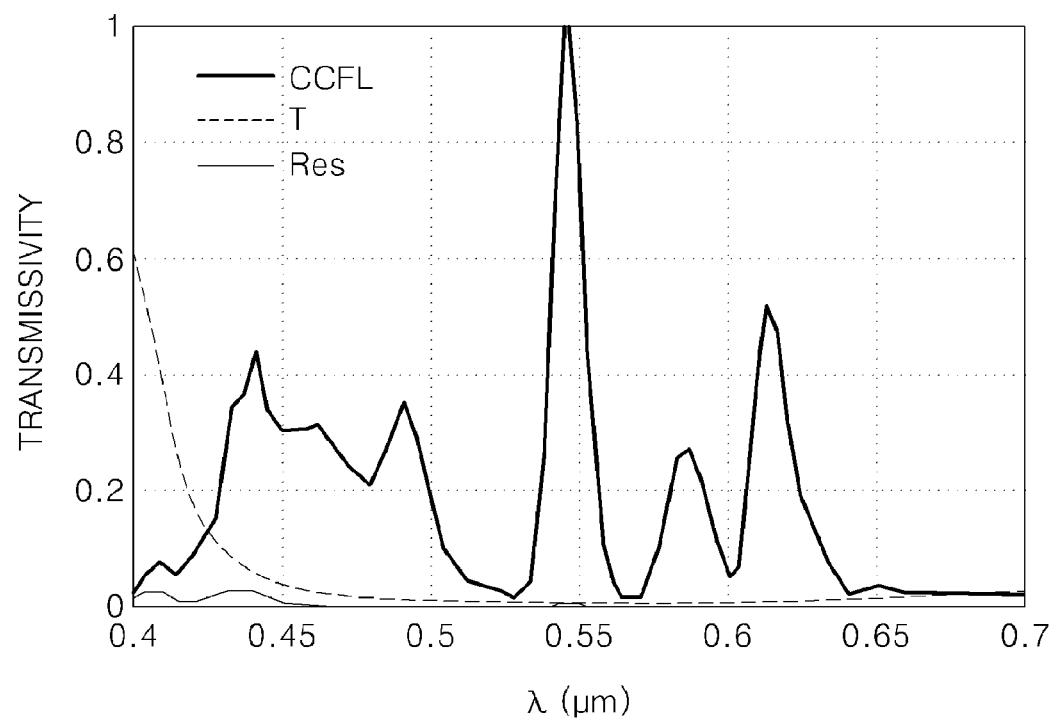
FIG. 13B is a graph showing a spectrum in a black mode of a display apparatus according to exemplary embodiments of the present invention.

A black mode (off mode) of a display apparatus according to exemplary embodiments of the present invention will now be described. Referring to FIG. 12, when a voltage is applied between the transparent electrode 35 and the metal thin film 22, the metal thin film 22 may attach to a portion of the dielectric multiple thin film 30 due to an attractive force. Since the metal thin film 22 attaches to the dielectric multiple thin film 30, an interval between the metal thin film 22 and the dielectric multiple thin film 30 may change. Since a transmissive band is shifted to an ultraviolet (UV) region due to the changed interference condition, a beam of visible light may not be transmitted thereby realizing a black color. When the thickness of a dielectric multiple thin film and the thickness of a dielectric layer are small, the transmissivity of visible light at a black mode decreases. The dielectric multiple thin film and the dielectric layer may be formed with a smaller thickness when they are stacked on a hard substrate such as a glass substrate, compared to a case when the dielectric multiple thin film and the dielectric layer are stacked on a soft substrate. FIG. 13A is a graph showing transmissivity T, reflectivity R, and absorption A in a black mode of a display apparatus according to exemplary embodiments. Referring to FIG. 13A, the transmissivity may be less than about 0.5% in the black mode. FIG. 13B is a graph showing a spectrum with respect to wavelength in a black mode of a display apparatus according to exemplary embodiments. Since the transmissivity of visible light is very low in the black mode (off mode), and the transmissivity of visible light is very high in an 'on' mode in which colors are realized, a contrast ratio may be very high. On-off switching may be performed by applying or not applying a voltage to each respective pixel. Each sub-pixel may include a plurality of cells. For example, each sub-pixel may include, for example, about 10 to about 20 cells, and each cell may have horizontal and vertical lengths of about 10 to about 150 μm Each cell may have materially the same structure as that of a sub-pixel illustrated in FIG. 2, and may be configured to perform on-off control for each respective cell. In addition, a gray level may be realized by selectively performing the on-off control on a single sub-pixel in a plurality of cells.

In a display apparatus, when light emitted from the backlight unit 10 is incident on the light modulator 20, the scope of the incident angle may not be large. When the scope of the incident light is large, significant color diffusion may occur. According to the exemplary embodiments described herein, significant color diffusion may not occur, since the display apparatus may be controlled so that light emitted from the backlight unit 10 is incident on the light modulator 20 at an angle of about 20 degrees or less.

An interference light modulator may emit a color light beam without a color filter, and may have higher light use efficiency than that of a liquid crystal optical modulator using a liquid crystal or a polarization film. In addition, the interference optical modulator may greatly reduce the optical transmissivity in an off mode for realizing a black color, thereby increasing color purity. A display apparatus including the interference optical modulator may realize a color image without a color filter, and may be manufactured by low manufacturing costs.

While the inventive concept has been particularly shown and described with reference to exemplary embodiments thereof, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. An interference light modulator, comprising:
   a substrate;
   a dielectric film disposed on a surface of the substrate, the dielectric film comprising at least two layers;
   a metal film spaced apart from the dielectric film;
   a dielectric layer disposed on an outer surface of the metal film; and
   a spacer disposed between the dielectric film and the metal film.

2. The interference light modulator of claim 1, wherein the spacer has a height in a range of about 50 nm to about 1000 nm.

3. The interference light modulator of claim 1, wherein the metal film comprises at least one metal selected from the group consisting of aluminum (Al), molybdenum (Mo), chromium (Cr), silver (Ag), gold (Au), tungsten (W), nickel (Ni), copper (Cu), and alloys thereof.

4. The interference light modulator of claim 1, wherein the dielectric film comprises a first layer and a second layer that are alternately stacked, a refractive index of the first layer differs from a refractive index of the second layer.

5. The interference light modulator of claim 4, wherein the first layer comprises titanium oxide ($TiO_2$) and the second layer comprises silicon oxide ($SiO_2$).

6. The interference light modulator of claim 1, wherein the substrate comprises a glass substrate.

7. The interference light modulator of claim 1, wherein the dielectric layer comprises an oxide, a nitride, or a combination of an oxide and a nitride.

8. The interference light modulator of claim 7, wherein the dielectric layer comprises a silicon oxide ($SiO_2$) layer.

9. The interference light modulator of claim 1, wherein each layer of the at least two layers has a thickness in a range of 10 nm to 1000 nm.

10. The interference light modulator of claim 1, further comprising a transparent electrode disposed between the substrate and the dielectric film.

11. A display apparatus, comprising:
   a substrate;
   a dielectric film disposed on a surface of the substrate, the dielectric film comprising at least two layers;
   a metal film spaced apart from the dielectric film;
   a dielectric layer disposed on an outer surface of the metal film;
   a spacer disposed between the dielectric film and the metal film; and
   a backlight unit to emit light towards the substrate or the metal film.

12. The display apparatus of claim 11, wherein the spacer has a height in a range of about 50 nm to about 1000 nm.

13. The display apparatus of claim 11, wherein the metal film comprises at least one metal selected from the group consisting of aluminum (Al), molybdenum (Mo), chromium (Cr), silver (Ag), gold (Au), tungsten (W), nickel (Ni), copper (Cu), and alloys thereof.

14. The display apparatus of claim 11, wherein the dielectric film comprises a first layer and a second layer that are alternately stacked, and a refractive index of the first layer differs from a refractive index of the second layer.

15. The display apparatus of claim 14, wherein the first layer comprises titanium oxide ($TiO_2$) and the second layer comprises silicon oxide ($SiO_2$).

16. The display apparatus of claim 11, wherein the substrate comprises a glass substrate.

17. The display apparatus of claim 11, wherein the dielectric layer comprises an oxide, a nitride, or a combination of an oxide and a nitride.

18. The display apparatus of claim 17, wherein the dielectric layer comprises a silicon oxide ($SiO_2$) layer.

19. The display apparatus of claim 17, wherein the dielectric layer has a thickness in a range of about 10 nm to about 200 nm.

20. The display apparatus of claim 11, wherein each layer of the at least two layers has a thickness in a range of 10 nm to 1000 nm.

21. The display apparatus of claim 11, further comprising a transparent electrode disposed between the substrate and the dielectric film.

* * * * *